(12) United States Patent
Downey

(10) Patent No.: US 11,573,150 B2
(45) Date of Patent: Feb. 7, 2023

(54) FLUID LEAKAGE CONTROL APPARATUS, SYSTEM AND METHOD

(71) Applicant: Graham A. Downey, Reddish (GB)

(72) Inventor: Graham A. Downey, Reddish (GB)

( * ) Notice: Subject to any disclaimer, the term of this patent is extended or adjusted under 35 U.S.C. 154(b) by 30 days.

(21) Appl. No.: 17/042,327

(22) PCT Filed: Mar. 28, 2019

(86) PCT No.: PCT/GB2019/000054
§ 371 (c)(1),
(2) Date: Sep. 28, 2020

(87) PCT Pub. No.: WO2019/186093
PCT Pub. Date: Oct. 3, 2019

(65) Prior Publication Data
US 2021/0018393 A1     Jan. 21, 2021

(30) Foreign Application Priority Data

Mar. 28, 2018  (GB) ...................................... 1805075

(51) Int. Cl.
*G01M 3/28*  (2006.01)
*F17D 5/02*  (2006.01)
(Continued)

(52) U.S. Cl.
CPC ............ *G01M 3/2815* (2013.01); *E03B 7/003* (2013.01); *E03B 7/071* (2013.01); *G16Y 40/35* (2020.01)

(58) Field of Classification Search
CPC ........... G01M 3/26–28; F17D 5/00–02; G16Y 40/35; E03B 7/00; E03B 7/003
See application file for complete search history.

(56) References Cited

U.S. PATENT DOCUMENTS 8,749,393 B1 *  6/2014  Tollefson ............. G01M 3/2815
                                                 137/460
10,309,861 B2 *  6/2019  Zhang ................... G01M 3/243
(Continued)

FOREIGN PATENT DOCUMENTS

CN   108571656 A  *  9/2018  ................ F17D 5/00
FR   2661971 A1  *  11/1991  ................ F17D 5/02
GB   2 524 589          9/2015

OTHER PUBLICATIONS

International Searching Authority: International Search Report and Written Opinion, App. No. PCT/GB2019/000054 (dated Jul. 31, 2019).

*Primary Examiner* — Nguyen Q. Ha
(74) *Attorney, Agent, or Firm* — Walters & Wasylyna LLC

(57) ABSTRACT

A fluid leakage control apparatus has at least one primary sensor (3), and at least one secondary sensor (5) connected together to communicate with a computer processor unit (13), to open at least one fluid flow valve (such as a solenoid valve), through which fluid such as water or gas can flow. It can be made using flow sensors connected to one or more of motion and sound sensors, and powered by AC mains power or batteries, to form a communication network with a computer or microcomputer. The apparatus may be installed along domestic or industrial piping systems, to monitor and prevent water wastage in the event of a burst pipe by closing off a mains valve (2). Also disclosed is a method of fluid leakage control to monitor sensors to ascertain a burst state, and close off a mains valve (2), preventing fluid wastage.

30 Claims, 5 Drawing Sheets

(51) Int. Cl.
  *G16Y 40/35* (2020.01)
  *E03B 7/00* (2006.01)
  *E03B 7/07* (2006.01)

(56) References Cited

U.S. PATENT DOCUMENTS

| | | | |
|---|---|---|---|
| 10,526,771 B1* | 1/2020 | Devereaux | E03B 7/003 |
| 2005/0275547 A1 | 12/2005 | Kates | |
| 2006/0137090 A1 | 6/2006 | Jeffries et al. | |
| 2011/0303310 A1 | 12/2011 | Klicpera | |
| 2012/0296580 A1* | 11/2012 | Barkay | G01M 3/243 |
| | | | 702/51 |
| 2013/0179096 A1* | 7/2013 | Stevens | G01M 3/243 |
| | | | 702/48 |
| 2017/0357275 A1 | 12/2017 | Smith | |

* cited by examiner

FLUID LEAKAGE CONTROL APPARATUS, SYSTEM AND METHOD

This application is a U.S. national phase application of Intl. App. No. PCT/GB2019/000054 filed on Mar. 28, 2019, which claims priority from GB1805075.7 filed on Mar. 28, 2018. The entire contents of PCT/GB2019/000054 and GB1805075.7 are incorporated herein by reference.

FIELD OF THE INVENTION

The present invention relates to a fluid leakage control apparatus and system. More particularly, but not exclusively, it relates to a fluid leakage control and prevention apparatus and system, and a method of using same, including one or more automated fluid flow sensing devices having feedback mechanism(s) which broadly can be described as "Internet of things" (IOT) devices.

BACKGROUND OF THE INVENTION

Every year burst pipes are responsible for leakages, flooding and/or accidents that cause serious damage to buildings and/or their contents all over the world. Historically, such types of damage undesirably influence home insurance premiums, especially in countries which experience hostile weather and/or sub-zero temperatures during the winter months, as insurers are obligated to pay out huge sums against "Buildings/Home" and "Contents" insurance claims. Further, in terms of gas leakages, the leaking of gas can sometimes continue to occur once it has begun and it has not yet been detected, and such gas leaks have been known to go undetected even until an undesirable event occurs such as a fatality or injury from an explosion or suffocation from inhalation of leaking gas.

It is known to provide fluid flow sensing devices that actuate valves in an attempt to prevent leakages or flooding from water as a result of burst pipes. Such devices may incorporate pressure absorbers, temperature sensors, timers and counters, valve combinations (some of which may be electrically operated), heating or insulation periphery and suchlike—all or some of which may be adapted to open or close valves, redirect fluid, sound alarms, detect and dislodge excess fluid pressure, or prevent water in pipes from freezing. Such actions are desirable for a number of reasons, one of which is to counteract water's thermal expansion, because as ambient temperatures begin to drop below freezing point, water inherently expands, causing an increase of pressure in the pipes in which it is contained. Even in the presence of a pressure relief valve, this slow build-up of pressure can place undue burden on the pipes in which the water flows—some of which may be made from metals, for example copper, which under intense mechanical stress are susceptible to deformation, forcing weak points on the pipes to expand, crack and rupture or burst. When the temperatures subsequently return to normal (i.e. above freezing point) and the frozen water within the pipes melt, water will leak through such cracks or "bursts", causing flooding as the pressurized water from the mains water supply is dissipated from the burst cracks, leading to the aforementioned damage to property and/or building contents.

GB2235490A discloses a burst pipe prevention system for a domestic water supply comprising a three-way valve that is actuated by a thermostat when the temperature approaches 0° C. so as to shut off the supply pipe and connect the upstream portion of the supply pipe to the drain pipe. It has a non-return valve that allows air into the system when the three-way valve is in the drain position, so as to enable water to automatically drain from the upstream portion of the supply pipe.

GB2472678A discloses an apparatus for preventing fluid leaking from a fluid system. It comprises a mains inlet pipe, a plurality of distribution pipes, a control valve positioned on the mains pipe and a timer set with a predetermined time, e.g. 6 minutes. The valve is controlled by a timer to shut off the mains supply in the event that fluid passes through the pipe for longer than the specified time. A remote control device is also provided to reset the valve once it has shut.

WO03/091669A discloses a household fluid flow-rate monitor and control system to prevent flood damage, fluid leakage and loss of fluid. It comprises: a plurality of alarm units for monitoring fluid flow in the system; an automatic electrically operated valve for shutting off the fluid flow to prevent damage; a fluid meter for sending to a monitor an electrical signal for every unit of fluid flowing through the system; and a controller unit including a microprocessor unit and a memory unit connected to the automatic valve to shut off the system. The monitor receives input from the fluid meter or from a flood sensor and sends alarm signals for several types of events, such as burst flow, leakage, flood, etc, to the controller unit. The unit is also provided with a manual override switch to bypass the electronics.

EP0051874A discloses an automatic controlling apparatus for a domestic water supply system having a detecting and impulse fitting for determining water flow, and a shut-off valve of an electromagnetic type which is connected with said fitting to constitute an integral unit. It has unions for connection to the water conduit, an adjustable timing relay is connected electrically to the detecting and impulse fitting and to the shut-off valve; a stub pipe of the detecting and impulse fitting accommodates a magnetic floating element which is held by the influence of forces on an inlet aperture and is lifted off by the pressure of water flowing therethrough, and in the lifted-off position it actuates a magnetic switch arranged externally on the stub pipe.

GB2179425A discloses a valve for use in a domestic water system. It has a flow passage closure member which is normally held in a valve-open position. A control means, including a timer, is responsive to flow through the flow passage and if flow continues for a predetermined time this control means operates to release the closure member to close the flow passage. The control means also includes a solenoid, the plunger of which normally holds the closure open but is actuated by the timer to release the closure, and a reed switch sensor activated by the flow through the passage and which triggers the timer to begin its counting. It also has a manual override that comprises a pin for retaining the closure open.

GB2368703A discloses a system which senses a flood or leak, including a flip-flop element which activates an electrical solenoid to close a valve upon reception of a signal from a detector sensing the leak or flood condition and remains closed if the solenoid is no longer energized, which may occur in the event of loss of the electricity supply. The valve may be subsequently re-opened by operating a resetting device.

However, the devices disclosed in the prior art documents discussed above are not ideally suited for preventing flooding as a result of bursting of pipes and the like for a number of reasons. Firstly, some of such devices tend to be solely reliant on electrical power and may be beset by electrical problems in the event of a power/electricity failure, which is common in the winter months in some areas experiencing hostile weather, as hail and snow storms bring down electrical distribution pylons, thereby cutting out power supply. This means that if these devices fail, the result is either a complete cut-off of water supply (if the mains supply valve is usually shut in standby position, or configured to shut in the event of power failure), or flooding if any cracks occur in the system during or within the period when there is power failure.

Additionally, most such devices are incapable of detecting or distinguishing between a tap that has been purposely opened on low flow (for example when it is desirable to moisten a piece of cloth), and water escape as a result of a burst pipe.

Furthermore, since some of the known devices work by detecting water pressure, they may be unable to distinguish between a leak and low pressure within the water pipe network as a result of genuine usage of water at more than one outlet (typically in a family home, when e.g. a shower is running while a washing machine in the kitchen is using the kitchen water outlet, perhaps simultaneously with water being drawn out of a garden tap, for example while watering the lawn or garden or washing a car). Thus, in such an instance there may be an undesirable intermittent interruption of water flow as a device according to the teaching of various prior art disclosures may wrongly perceive low pressure levels as equating to the presence of a burst pipe and thus reacts (wrongly) to cut off the water supply.

Further still, considering some the devices that operate using timers which detect the length of time of continuous flow, or the volume of water dispensed per unit time, it appears that they may be unable to distinguish between unauthorised water escape from continuous water usage, for example a user who is having a long shower, or during the warm summer months a lengthy garden watering session, both of which may trigger the flood prevention mechanism and (wrongly) cut-off or interrupt the water supply. Furthermore, it would not make a difference if a water leak prevention system were to take six minutes from the time of detection of a potential leak to activating and shutting off the mains supply valve, because in the presence of a burst pipe six minutes is a long time, since the water from the mains supply is usually pressurized, and in six minutes a large volume of water would have already squirted through the ruptured or broken pipe causing considerable damage to the building and contents.

Finally, some of the known devices of the prior art are not user-friendly, and they cannot be used on other types of fluid system, for example gas pipes. Indeed, in many cases they are costly to manufacture, and may entail a complicated installation procedure, all of which may add further cost to the overall cost of adopting the technology, thereby putting off potential customers.

Accordingly, there remains in the art a need for a "smart" and robust system for detecting leaks, bursts and pressure surges within a domestic or industrial water or gas supply system.

In addition, there remains a need for a cost-effective and functional, easily optimized, efficient, highly accurate burst prevention system capable of distinguishing between a desired fluid flow and an undesired fluid flow, and that can be implemented on both domestic and industrial water or gas supply systems.

It is thus an object of the present invention to obviate or ameliorate the above problems and provide an improved apparatus, system and method of fluid escape detection and control.

SUMMARY OF THE INVENTION

According to the first aspect of the present invention, there is provided a fluid leakage control apparatus comprising a primary sensor means disposable generally along or within a fluid flow path downstream of a mains fluid supply inlet means, at least one secondary sensor means disposable along or within the fluid flow path generally downstream of the primary sensor means and preferably adjacent a fluid outlet means, at least one processor means operably connectable communicably with either of the primary sensor means, the secondary sensor means or both thereof, and at least one control valve means adapted or configured to disrupt fluid flow along the fluid flow path and operably connectable to receive instructions from at least one of the primary and/or secondary sensor means, wherein in use the primary sensor means and the secondary sensor means are adapted or configured to exchange information therebetween so as to detect an unauthorized fluid flow state.

Preferably, the primary sensor means may comprise a flow sensor. The primary sensor means may be adapted or configured to detect flow of fluid (for example liquid or gas) within or along the fluid flow path.

The primary sensor means may comprise a mechanical flow register or other fluid flow sensing device. Alternatively, the primary sensor means may comprise a mechanical revolving means disposable within the fluid flow path, and rotatable therewithin using or under the motion or force of moving fluid.

Preferably, the primary sensor means may be provided with wireless communication means, which are operable or configurable to enable it to send and/or receive electromagnetic signals using a transceiver means.

Alternatively or additionally, the primary sensor means may be provided with electric cabling means for use in sending and/or receiving electrical information.

Preferably, the primary sensor means may be provided with power supply means, for example a battery or means of connection to a mains power supply.

The primary sensor means may be powered using a suitable mechanical power generation means, such as one disposable within the fluid flow path, for example one or more rotors driven by fluid flow and connected to a generator.

Alternatively or additionally, the primary sensor means may be provided with a power failure/shut-down power supply means, for example a battery cell, which in use is adapted or configured to effect closure of the control valve means in the event of a mains power failure.

Preferably, the fluid flow path may comprise one or more pipes or conduits.

The fluid flow path may comprise a suitable channel means through which fluid (for example drinking water, heating oil or domestic gas) may be channelled, from a mains supply inlet means to an outlet means.

Preferably, the outlet means may comprise a water outlet means. The water outlet means may comprise a water tap, toilet tank water supply inlet, washing machine water supply inlet, shower, boiler water supply inlet, and the like.

Alternatively, the outlet means may comprise an oil or gas outlet means.

Alternatively, the outlet means may comprise an industrial supply outlet, for example a supply outlet on a beverage mixing machine.

Preferably, the secondary sensor means may comprise a flow sensor adapted or configured to communicate with the primary sensor means and/or the control valve means. Advantageously, the secondary sensor means may be adapted or configured to detect fluid flow within or along the fluid flow path.

Alternatively or additionally, the secondary sensor means may comprise a motion sensor. The motion sensor may be located adjacent the outlet means, and in use may detect that there is movement in one or more areas where a fluid can be drawn off.

Alternatively or additionally, the secondary sensor means may comprise a fluid sensor, which in use may detect the presence of fluid such as water or gas in the vicinity thereof.

Preferably, the secondary sensor means may be disposable adjacent or as near as possible (i.e. as close as its configuration and space allows) to an outlet means, for example connected to a tap's tail.

Preferably, the secondary sensor means may be provided with wireless communication means, which are operable or configurable to send and/or receive electromagnetic signals using a transceiver means.

Alternatively or additionally, the secondary sensor means may be provided with electric cabling means for use in sending and/or receiving electrical information or signals.

Preferably, the secondary sensor means may be provided with power supply means, for example a battery or means of connection to a mains power supply.

Additionally or alternatively, the secondary sensor means may be powered using a suitable mechanical power generation means, such as one disposable within the fluid flow path, for example one or more rotors driven by fluid flow and connected to a generator.

Alternatively or additionally, the secondary sensor means may be provided with a power failure/shut-down power supply means, for example a battery cell, which in use is adapted or configured to effect closure of the control and/or inlet valve means in the event of a power supply failure.

Preferably, the processor means may comprise a computer processor means. Alternatively or additionally, the processor means may comprise one or more switching controllers, for example relay switches.

Preferably, the computer processor means may be adapted or configured to coordinate and/or send electrical and/or electronic signals between the primary sensor means and the secondary sensor means.

Advantageously, the computer processor means may be adapted or configured to coordinate and/or send electrical and/or electronic signals between the secondary sensor means and the control valve means.

Optionally, the computer processor means may be adapted or configured to coordinate and/or send electrical and/or electronic signals between the primary sensor means and the control valve means.

The computer processor means may be adapted or configured to send wired and/or wireless signals to a central command or control centre using electromagnetic waves.

Further, the computer processor means may be adapted or configured to be built into one or more of the sensor means.

Preferably, the control valve means may comprise a solenoid valve. Advantageously, the control valve means may be adapted or configured to interrupt fluid flow within the fluid flow path. The control valve means may comprise a mechanical valve, for example a spring based valve or a diaphragm valve.

Preferably, the secondary sensor means may be adapted or configured to send signals indicative of fluid flow to the primary sensor means, using the transceiver means.

Advantageously, the secondary sensor means may be adapted or configured to send signals to the primary sensor means, such signals being indicative of the absence of fluid flow, using the transceiver means.

The secondary sensor means may be adapted or configured to send signals indicative of fluid flow to the computer processor means.

Preferably, the primary sensor means may be adapted or configured to send signals to the control valve means.

Advantageously, the primary sensor means may be adapted or configured to enable the control valve means to close or open the fluid mains supply.

The primary sensor means may be adapted or configured to enable the control valve means to close or open the fluid mains supply, in response to signals sent from the computer processor means.

In some embodiments, the fluid leakage control apparatus may preferably be provided with one or more manual bypass valves. The manual bypass valve(s) may be enabled or disabled by a switch means or remote control means. Further, the bypass valve(s) may comprise an electronic bypass valve or other suitable valve means. The computer processor means may be adapted or configured to communicate with any one or more of the bypass valve(s).

Alternatively, additionally or optionally, the fluid leakage control apparatus may be provided with inbuilt bypass capability within the control valve means, for example one or more zone valves.

Preferably, the apparatus may be provided with alarm means for providing an audio and/or visual signal of the presence of a leak or potential leak.

Optionally, or additionally, the fluid leakage control apparatus may be adapted or configured to send a text message to a telephone number, or an email or other form of electronic message to a designated recipient, informing the recipient or the owner of the number, e.g. a proprietor of a premises, of the leak or potential leak.

The apparatus may be provided with switch means for disabling the alarm or for effecting a temporary snooze function that temporarily silences the alarm for a pre-set period.

Alternatively or additionally, the apparatus may be provided with a visual signal means and/or user interface panel, for example an amber light or display panel, adapted or configured to display messages, for providing a visual signal or indication of the state of the system, optionally logging errors, and/or warning of the presence of a leak or potential leak.

In some embodiments, the apparatus may preferably be provided with a timer means for recording the length of time of continuous or uninterrupted fluid flow.

In some embodiments, the apparatus may be provided with remote control means for resetting a shut-off control valve that may effect disruption or cut-off of, or may have disrupted or cut off, fluid flow.

Further, in some embodiments, a standalone interface or display unit may be provided for effecting any of, or any combination of: providing information on the state of the system, providing an indication of any suspicious fluid flow, storing a log of events, and coordinating the different integers of the system; and thereby functioning as a central communications and/or control unit.

Optionally or additionally, in some embodiments, the apparatus may be provided with a pressure buffer or expansion vessel operatively connectable to the control valve means and a pressure sensor means. In use the pressure buffer may function to maintain pressure levels by momentarily opening, e.g. opening for only a short or very short period of time (such as for less than 0.1 or 0.2 or 0.5 or 0.7 or 0.8 or 1 or 2 or 3 seconds), a valve upon detection of a drop in fluid (e.g. water) pressure. An optional flow sensor that subsequently detects this unauthorized flow may then quickly shut off the valve again, overriding the pressure sensor. In such an embodiment, it may be desirable for the flow sensor to communicate electrically or electronically (or even wirelessly) with the pressure sensor.

Additionally or optionally, one or more of the sensor means may be switchable, for example by virtue of being provided with a switch having an "on" or "off" state, for enabling or disabling the fluid leakage control apparatus, and/or the switch itself.

Advantageously, in some embodiments, each sensor means may be able to be turned on or off, and the apparatus may be disabled, from a switch, thereby cutting off supply from the mains fluid (e.g. water) supply without the need to access the mains control valve.

In some embodiments, the apparatus may be provided with switch means, for example one or more relay switches and optionally one or more computer processing means for coordinating signals thereof.

Preferably, each sensor means may be provided with indicator means, for example an LED or lamp or other visual indicator, for indicating when there is fluid flow in each sensor means. Advantageously, the indicator means may provide a visual aid to alert the presence of fluid flow within each sensor means.

Preferably, the apparatus may be provided with power supply means, for example a battery or connection to an electricity supply, e.g. a mains supply, for powering each of the valve means and each of the sensor means.

Each of the sensor means may be adapted or configured to communicate with at least one of the valve means. For instance, each of the sensor means may be provided with wired or wireless signal communication means for electrically or electronically communicating with one or more of the valve means.

Alternatively, the valve means may comprise one or more manual valves operable using e.g. geared or motorised retrofit devices that are operable by the respective sensor means.

In some embodiments, the apparatus may preferably be provided with gas inlet means. Advantageously, the gas inlet means may be operable to allow compressed or non-compressed air or other gas to be introduced into the relevant piping or pipework/conduit(s), for the purpose of, in use, determining the position of a hole, crack, burst or fracture, in the event of a burst pipe.

According to a second aspect of the present invention, there is provided a system of fluid leakage control comprising a first valve means generally disposable along or within a fluid flow path so as to isolate a section of the fluid flow path that feeds into a cold water storage tank from a section of the fluid flow path connected to the mains fluid supply, a first flow sensor means disposable generally along or within the fluid flow path, preferably downstream of (i) a hot water cylinder and (ii) an expansion pipe of a cold water tank, the first flow sensor means being adapted or configured to detect fluid flow across it; a second flow sensor means disposable downstream of the cold water storage tank, adjacent (or preferably so) a second valve means that is disposable adjacent the outlet of the cold water storage tank, the second valve means being adapted or configured to isolate the cold water storage tank from the hot water cylinder, wherein, in use, the first flow sensor means is adapted or configured to communicate with the second flow sensor means to detect an unauthorized fluid flow state.

Preferably the first valve means may be adapted or configured, in its standby state, to be in a shut-off or closed position.

Advantageously, water from the cold fill may be isolated from the water in the cold water storage tank.

The first valve means may prevent water from the cold fill from mixing with the water in the cold water storage tank.

Preferably the second valve means may be adapted or configured, in its standby state, to be in an open position.

Advantageously, water from the cold water storage tank may be in fluid communication with the water in the hot water cylinder by means of the water in the pipe(s) leading to the cylinder.

Preferably, the first valve means may be provided with a bypass valve means. Alternatively, the first valve means may comprise an inbuilt bypass valve means.

Preferably, the first flow sensor means may be adapted or configured to open or close the first valve means.

Advantageously, the second flow sensor means may be adapted or configured to close the second valve means.

Alternatively or additionally, the first flow sensor means may be adapted or configured to close or open the second valve means.

Alternatively or additionally still, the second flow sensor means may be adapted to open or close the first valve means.

According to a third aspect of the present invention, there is provided a fluid leakage control method comprising providing a fluid leakage control apparatus or system as defined in either of the first two aspects above or any embodiment of either thereof, followed by the steps of: monitoring a fluid flow path to ascertain if there is fluid flow within the fluid flow path; upon detecting fluid flow, awaiting a signal from a sensor means indicative of a recognised or authorised fluid flow, and starting a counter or timer; and if no signal indicative of fluid flow is received after a predetermined period, sending a signal to a valve to interrupt or shut off the valve, thereby closing off fluid supply from an inlet supply, and thereby preventing leakage of fluid from the fluid flow path.

According to a fourth aspect of the present invention, there is provided a fluid leakage control method comprising providing a fluid leakage control apparatus or system as defined in either of the first two aspects above or any embodiment of either thereof, and associated computer software that undertakes the steps of checking if there is a fluid flow path to ascertain if there is fluid flow within the fluid flow path; upon detecting fluid flow, awaiting a signal from a sensor means indicative of a recognised or authorised fluid flow, and starting a counter or timer; and if no signal indicative of fluid flow is received after a predetermined period, sending a signal to a valve means to interrupt or shut off the valve means, thereby closing off fluid supply from a mains inlet supply means, and thereby preventing leakage of fluid from the fluid flow path.

Preferably, the system of the invention may be adapted or configured to be highly sensitive to detect holes, bursts, cracks, fractures, leaks or drips within the fluid flow path.

Advantageously, the system may be adapted or configured to prevent dripping taps and/or low flowing fluid flow as a result of crack(s) within the fluid flow path and/or worn-out washers that commonly cause dripping of taps.

In some embodiments, the system may preferably be provided with switch means, which are disposable adjacent a fluid outlet means. Advantageously, the switch means may be operable upon operation of a tap or fluid outlet, whereby it emits a signal to request fluid from the sensor means.

The system may be adapted or configured to open the mains inlet supply means upon detection of a stimulus signal from the switch means, such signal being effected by a user operating a tap.

Other aspects, embodiments and features of the invention in various embodiment forms thereof that may be practised are as set out in the appended claims in this specification.

Within the scope of this application it is envisaged that the various aspects, embodiments, examples and alternatives, and in particular the individual features thereof, set out in any of the foregoing text, in the claims and/or in the following description and drawings, may be taken independently or in any combination. For example, features described in connection with one particular embodiment are applicable to all embodiments, and may be used either singly or together in any combination, unless expressly stated otherwise or such features are incompatible.

BRIEF DESCRIPTION OF THE DRAWINGS

For a better understanding of the invention and to show how the same may be carried into effect, there will now be described, by way of non-limiting example only, various specific embodiments, methods and processes within the scope of the present invention, with reference to the accompanying drawings, in which.

DETAILED DESCRIPTION OF EMBODIMENTS

There will now be described by way of example a specific mode currently contemplated by the inventor(s) for putting the present invention into practical effect in various embodiments. In the following description numerous specific details are set forth in order to provide a thorough understanding. It will be apparent, however, to one skilled in the art that the present invention may be practised without limitation to these specific details. In other instances, some well-known methods and structures have not been described in detail so as not to unnecessarily obscure the description.

Figure 1:
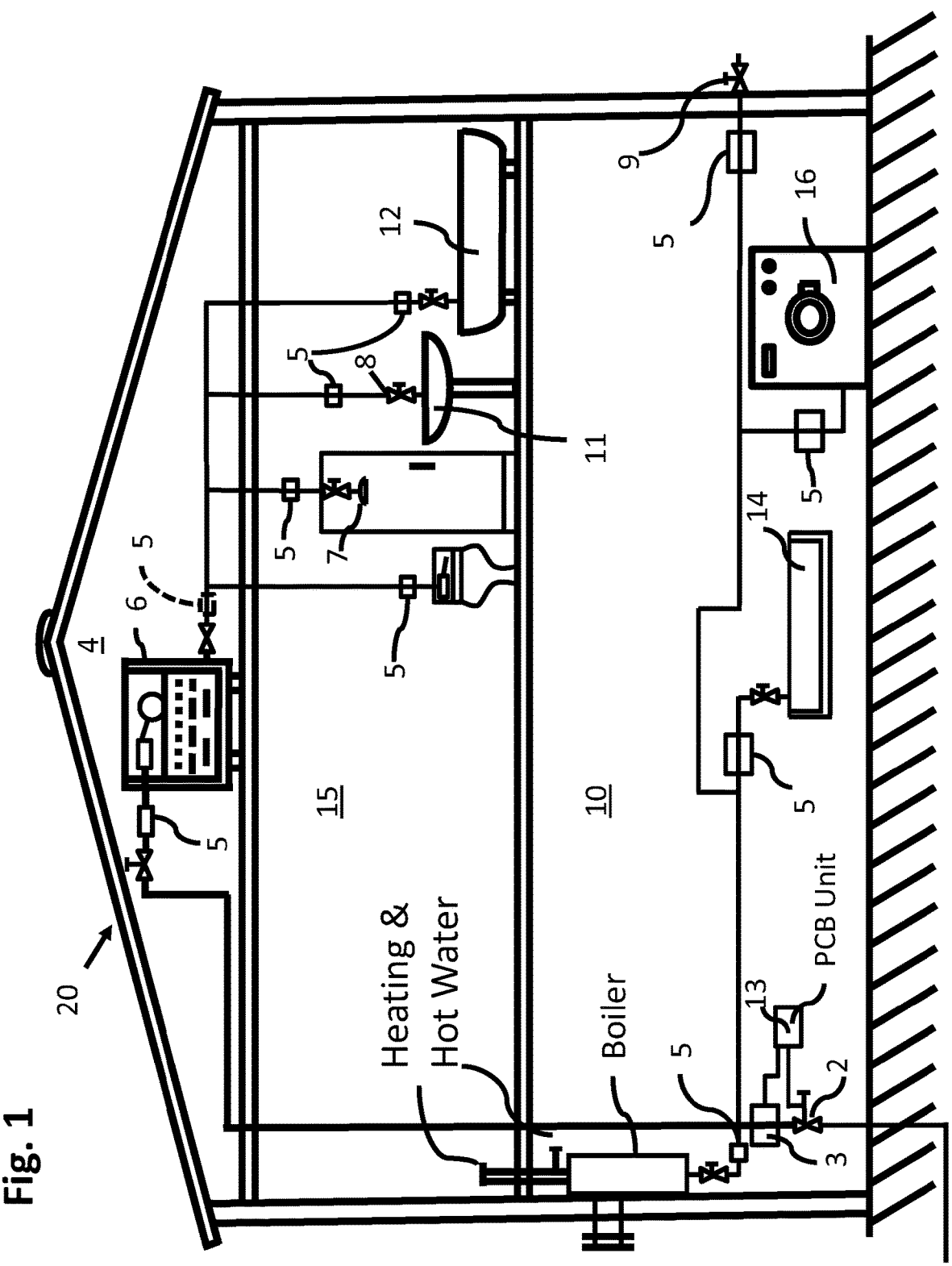
FIG. 1 is a schematic diagram showing an embodiment apparatus in a typical domestic water installation.

Referring to FIG. 1, a fluid leakage control apparatus has a primary flow sensor 3 disposable generally along and within a water flow path, for example in a domestic water pipe in a property 20, downstream of a mains supply inlet. However, in the case where the mains supply control valve 2 is placed at a distal end of water piping within a property's boundary, or away from the point where water first enters a property, then preferably the primary flow sensor 3 should be located as close as possible to the point where the water first enters the property's boundaries (which in this case is defined as the proximal end of the water piping).

While the present embodiment shows only one primary flow sensor 3, it will be apparent to the skilled person in the art that two or more primary flow sensors 3 could be used, for example in tandem, depending on the installation requirements, or in the interest of accuracy, e.g. in the event one primary flow sensor 3 were to fail.

The apparatus is provided with at least one secondary flow sensor 5, although depending on installation requirements, more than one secondary flow sensor 5 may be fitted at each outlet as required, for example one for the kitchen sink 14, another for the loft 4, and a third on the washing machine 16 supply inlet, and so on.

For the water leakage control apparatus to work optimally, each secondary flow sensor 5 is installed along and within the water flow path, downstream of the primary flow sensor 3, and preferably adjacent a water outlet such as a water tap 8, 9.

Alternatively, the or each secondary flow sensor 5 may comprise a retrofit device (not shown) that can be fitted onto a tap or near to it, so as to detect water flow, for example a cam type switch or a spindle arrangement may be used which is connectable to the tap and can recognize the tap's "open state" (i.e. the state when there is water flowing out of the tap) and its "closed state" (i.e. when there is no water flowing). Alternatively, other suitable water flow detectors may be used.

Figure 5:
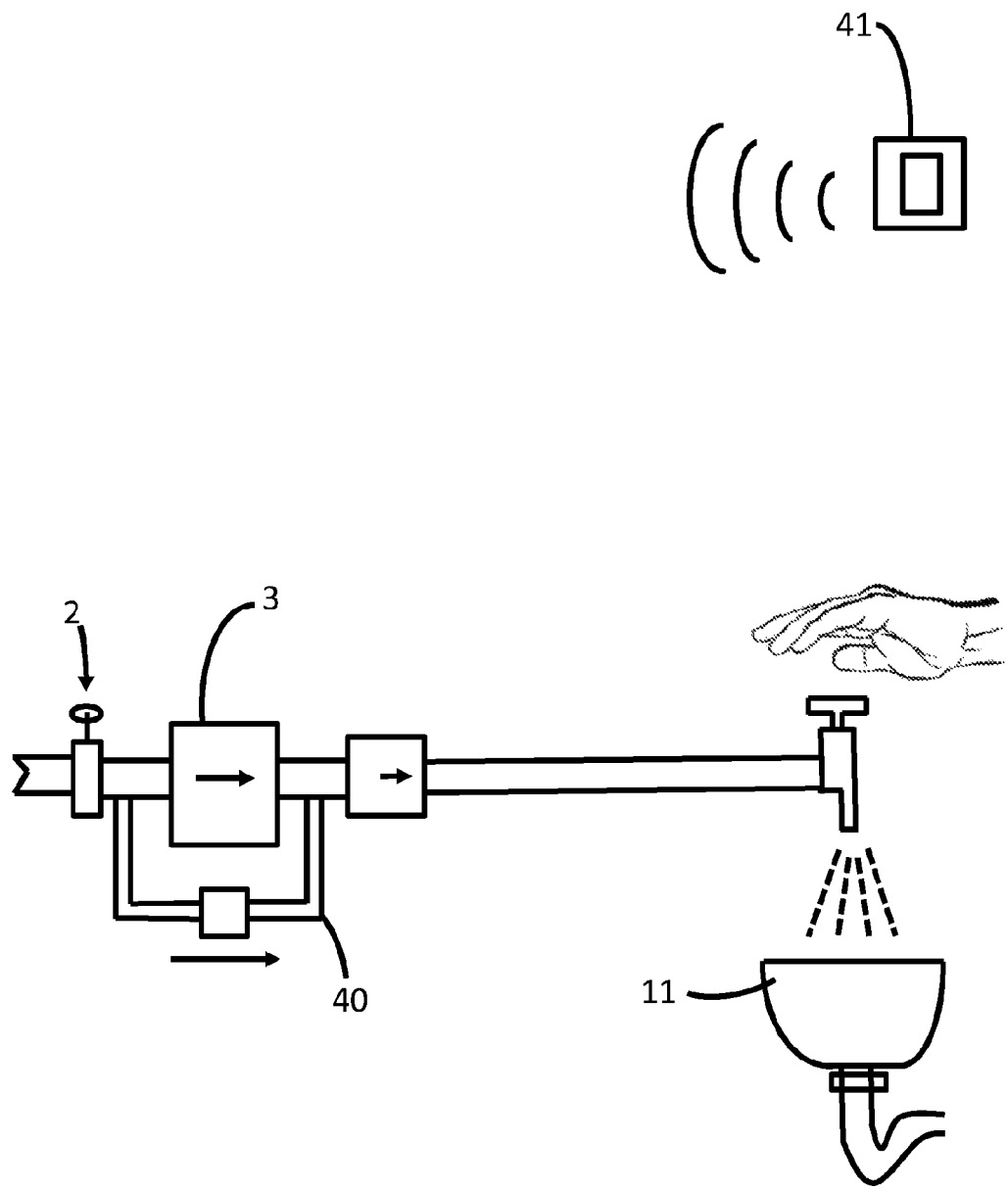
FIG. 5 is a schematic diagram of the apparatus connected to a bypass pipe relative to the control valve, the primary sensor and a motion sensor near a sink.

One or more sound sensors (not shown) and/or motion sensors 41 (FIG. 5), or a combination of both working together in conjunction, may be used together with the secondary flow sensor(s), or instead of the secondary flow sensor(s). Such can be made to work in a number of ways. For example, when a motion sensor 41 in one room has been triggered by someone in the room, it can communicate to a computer processor unit 13 that motion has been detected, and therefore any fluid flow from an outlet is authorized. A sound sensor also installed in that room can subsequently take over from the motion sensor to continue registering the presence of someone in the room to the computer processor unit 13, e.g. as long as sound is being registered by the sound sensor. Thus, when fluid is drawn out of an outlet, for example a tap, the sound sensor communicates with the computer processor unit 13 to confirm that there is sound being received, and therefore that someone is in the room, which means the control valve 2 should be kept in an open state. The system can then be made to reset after a certain period of inactivity (say, after 10 minutes, so long as no sound above a pre-determined level, nor movement, is detected in that time), until after the motion sensor and/or sound sensor is/are reactivated. The effect of this will be that if someone leaves a tap open in their bathroom, it will run for 10 minutes, then the control valve 2 will be shut off and no further water will be wasted. For ease of convenience, an override that can be set for various time periods (say, anywhere between 1 min to 8 hours) can be provided to prevent inconvenience. The sound sensor may comprise a microphone, whereas the motion sensor may comprise a passive infrared (PIR) sensor. Both the sound sensor and the motion sensors could be installed anywhere in the property, depending on the location of water outlets, and both may be wired or designed to communicate with the computer processor unit wirelessly. Here it may well be important for the motion sensor to be height sensitive, to prevent pets and the like triggering it.

Each flow sensor 3, 5 is, in use, adapted or configured to contain a volume of water within it, for example a hollow flow sensor that is connectable between two pipes will contain water within it when connected to the domestic water system. For the purposes of clarity, in domestic/industrial installations, the mains supply inlet is the point at which water from the water supply company enters the building's boundaries. Usually, although not always, there will be an isolating valve (also known as a "stop cock") near the supply inlet.

The computer processor unit 13, for example on a PCB circuit board, is operatively connected to communicate with the primary flow sensor 3, the secondary flow sensors 5 and or a mains supply or control valve 2. The PCB circuit board may be provided with visual indicators for each sensor, for example LEDs that illuminate or light up when there is flow in a particular branch of the pipework. To effect this, each sensor 3, 5 may be provided with a digital tag, or identifier, which in use is recognizable by the PCB unit, or other sensor(s). This is important because, in a standby state, the sensors 3, 5 may be adapted to emit a standby signal that informs the primary flow sensor 3, or PCB unit, that each of the secondary flow sensors 5 is "live" or functional. Should a flow sensor 3, 5 develop a fault, its corresponding operational signal will no longer be present and the apparatus will thus log a fault to a control center, or on the visual display panel.

Alternatively, the computer processor unit 13 may be adapted to communicate only with either the primary flow sensor 3 or one or more of the secondary flow sensors 5, and the control valve 2. The computer processor unit 13 has a transceiver (not shown) that is adapted to send or receive electrical signals, such signals being indicative of the state of fluid within the pipe or at an outlet. The mains control valve 2 is adapted to close off or open the supply of water from the mains supply inlet, thereby disrupting or providing water to the fluid flow path. This is possible because the control valve 2 is operable using electrical signals from at least one of the flow sensors 3, 5 which instruct it to open or shut off the control valve. In a "shut-off" state, the piping downstream of the control valve 2 is isolated from the pressurized water from the mains supply, and thus any cracked or ruptured points in the pipe will not lead to flooding or any major damage as the only water than could flow out of such cracks is that which is held within the piping itself, downstream of the control valve 2.

Note that in FIG. 1, the standby state of the apparatus is with the control valve 2 being in an "open" position (i.e. allowing fluid to pass through it), such that there is water freely flowing from the mains supply inlet into the property 20 once any water outlet 7, 8, 9, 12, 14, 16 is operated, for example by opening a water tap. Thus, in use, when a water tap is operated by a user (for example in order to pour some water into a cup), once the water begins to flow, the relevant secondary flow sensor 5 will detect or pick-up this flow and inform the primary flow sensor 3. The primary flow sensor 3 will then communicate with the computer processor means 13 to inform it that the water flow is "authorized" or "authentic", and that the control valve 2 should not be interrupted but should be left open. At this point a timer may be started, and the volume of water flowing past the secondary flow sensor 5 may be logged. Against a pre-calibrated scale, if continuous flow and the volume of water surpasses a certain preset threshold value (one way of achieving which may be a counter in the software or hardware that calculates the approximate amount of water passing through or across a certain circumferential plane of pipe per second, or using a fluid meter that sends signals to a monitor [which can be a monitoring routine within the computer processor unit] in the form of an electrical signal for every unit of fluid flowing through the pipe next to the tap or outlet), an alarm signal may be sounded. This is primarily to avoid a situation where the inhabitants of the property are nearby and can be summoned by the alarm signal—for example if a user inadvertently leaves a tap running in the kitchen 10 or bathroom, and goes to the living room, and is e.g. captivated by a television program, forgetting about the tap in the kitchen, or if a damaged pipe behind a dishwashing machine 16 begins leaking, without the knowledge of the inhabitants of the property.

Thus, if there is no response to the alarm signal after a certain period of time, the computer processor unit 13 (or the primary flow sensor 3) will pass a shut-off signal to the control valve 2 to shut off the mains supply, thereby disrupting the water flow.

The system can be adapted to be set or reset by a press of a button on a control user panel, e.g. by voice commands or using a remote control. The reset will give instructions to the computer processor unit 13 to re-open the control valve 2. However, if there is a leak this will be automatically picked up, since while there will be a "fluid flow" signal registering at the primary sensor 3 in a "leak state", even after a reset, yet there will be no corresponding signal registering at the secondary sensor 5, so after a predetermined period (for example between 1 and 5 seconds), the primary sensor 3 will again shut off the control valve 2. Thus, if the control valve 2 keeps shutting off even after a number of resets, it may be a very good indicator that there is a leak somewhere within the property's piping.

Alternatively, a switch may be provided to set the control valve 2 to be in a "closed state" by default, and to only open when the motion sensors and/or sound sensors have detected motion and/or sound. This means that after the motion or sound sensors have registered activity in a room, a signal would be sent to the control valve 2 to open it, and water would be allowed to flow for a period of time (for example, for 20 minutes). And each subsequent time that the motion and/or sound sensors are activated, a timer will be reset to begin counting up to a further 20 minutes in which the control valve 2 is left open. As an alternative to this, the timer may be automatically reset after a certain amount or volume of flow. For example, in instances when a user has inadvertently left a tap flowing, a flow meter sensor may be provided nearer to the main control valve 2, or incorporated into it, such that once a motion sensor has detected movement, the amount of flow begins to be measured (say, within the next 10 seconds, but adjustable by a user), and the results are periodically stored in the computer processor unit's memory, to form historical data. Thus, if after a tap is opened, and authorized flow is registered, the flow rate were to increase significantly (or at least divergently from historical data records), after the motion and sound sensors not detecting any movement nor sound, the control valve 2 will be closed off. This is useful if a burst or leak develops when the water is flowing to an authorized outlet such as a sink, or bathtub, or a washing machine. A notification (such as a buzzer or flashing light) may be provided to alert the property's inhabitants that there is an uncharacteristic increase in flow which could be indicative of a burst or leak somewhere in the system.

Further, if the system is installed along or within a fluid system where the control valve 2 of the mains supply inlet is in a closed state in its resting or standby position, the sensors' function may be reversed, in that stimuli of flow will only be acted upon (in this case to open a valve) if a secondary sensor registers flow. However, the primary sensor may be adapted to periodically open the control valve 2, preferably each time for a couple of seconds so as to maintain the correct water pressure within the system, should there be a pressure drop in the piping due to dripping taps and suchlike, to test for the presence of a burst.

Alternatively, such tests could be undertaken using a small bypass pipe, which branches off from the main water channel, to reconnect to it upstream of the pipe. The purpose of having a bypass with a smaller internal circumference may be precautionary in that when the system is conducting tests or system checks to check for the presence of a burst or leak in the piping, and a burst or leak has developed, a smaller pipe would generally allow lesser volumes of water into the system per unit time than would a wider pipe.

Figure 4:
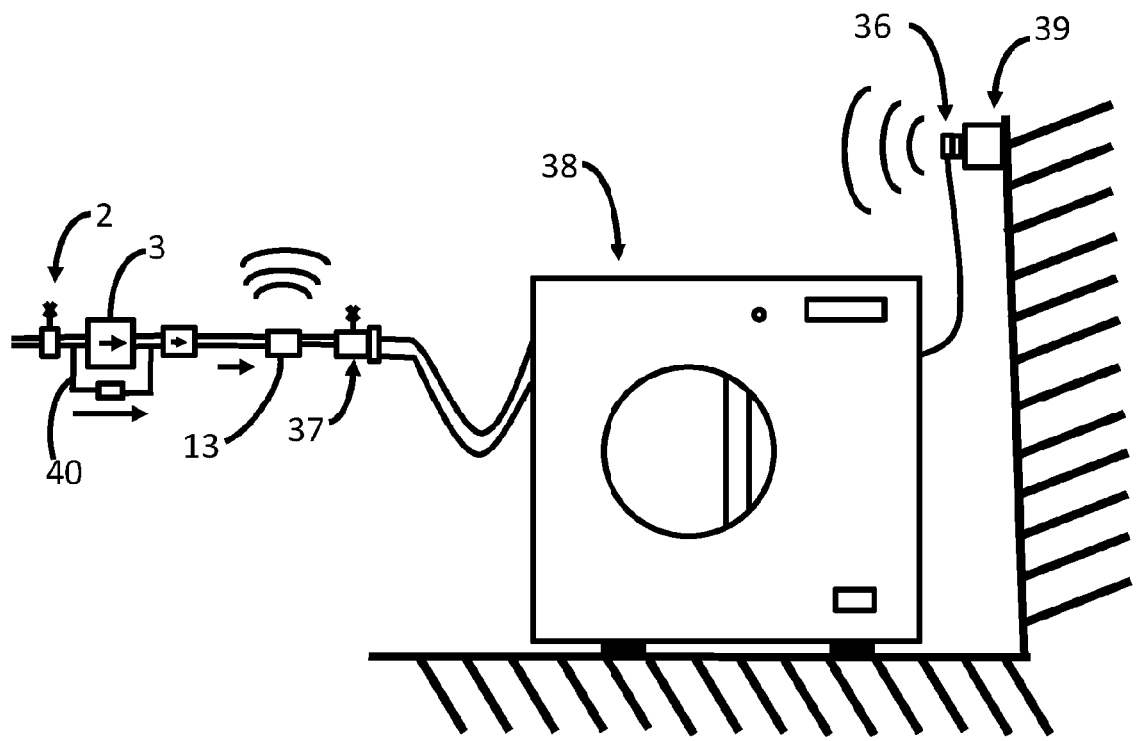
FIG. 4 is a schematic diagram of the apparatus connected to an appliance, showing the position of a hold-off valve relative to the computer processor unit and primary sensor.

As an alternative or other option, and in accordance with an embodiment of the fourth aspect of the present invention, the system in use is adapted to detect a user stimulus, for example the action of operating a tap, whereby such a stimulus effects opening or closure of the mains valve 2. In such an implementation (when the mains valve 2 is normally closed in a standby position), then the user stimulus will enable a switch means (not shown) to send a signal to the primary sensor 3 or computer processor unit 13, to open the main valve 2. If a dripping tap develops as a result of a worn-out washer or suchlike, then since the mains control valve 2 is in a shut-off state, little or no water will be available for prolonged dripping of taps, preventing sustained water wastage, yet if a user operates a tap, an authentic signal requirement will be sent, effecting the primary sensor 3 to open the mains control valve 2, letting water through. However, certain appliances, for instance washing machines or dishwashers that have been timed to begin a wash automatically when no one is in the building, will need to draw water without triggering movement in the motion sensors 3, 5. Overcoming such a problem may involve using a magnetic field sensor to detect when the washing machine is drawing off water, and or connecting a power consumption sensor 36 (FIG. 4) and a hold-off valve 37 (FIG. 4) to the power supply to detect power consumption by the washing machine 38. This is possible because when a washing machine is requesting for water, there will be a draw of power from the mains power supply 39. This electrical power consumption is detectable, and can be used to send a signal to the computer processor unit 13 to leave the control valve 2 open each time the machine is drawing water.

The power consumption sensor 36 and hold-off valve 37 combination to such appliances could be set to delay the activation of water entering the machine for, say, 10 seconds. The reason for this is that if a burst or leak had developed somewhere in the system, allowing the control valve 2 to stay open for a long time, this would also invariably allow water to pass through the burst or leak in the pipework at the same time, causing damage. Thus, a delay would enable the primary flow sensor 3 to ascertain if there is unauthorized flow indicative of a burst or leak within that 10 second test period, once it has been opened, and before the hold-off valve opens—to allow water to pass through the secondary flow sensor 5 into the machine or appliance. This way, the computer processor unit 13 would open the control valve 2 for, say, up to 10 seconds, and if there is flow registering on the primary sensor 3, even when none of the secondary flow sensors 5 are registering flow, the computer processor unit 13 would shut off the control valve 2, until a time that an engineer or plumber has examined the piping and reset the system. If there is no flow, the hold-off valve will open after that 10 seconds, and water will enter the washing machine.

Alternatively, during the short test period, the control valve 2 could open partially, to control and monitor flow rates, or by having a valve with more than one port, for instance the smaller bypass pipe 39 (FIG. 5) with a smaller internal circumference, such that low flow and normal flow can be distinguished from each other. This would also be useful to ascertain if an unexplained flow is a leak such as a dripping tap, or a burst in the system. If there were a major leak, a smaller internal circumference would allow less water to escape through the leak in the test period (meaning less damage) than would a larger pipe. An alternative way of distinguishing between a leak and a dripping tap would be to provide sensors in the waste pipe channels (not shown), so that water escaping down a drain pipe can be logged, whereas water escaping through a burst or leak would not register a flow in any of the sensors 3, 5. These could be configured to work with moisture sensors, but would need to be settable to detect increased flow of water, and to distinguish between full flow and moisture. There are various types of flow monitor sensors that could be incorporated to perform this function, for example sensors having a NTC thermistor, as commonly used in fuel tanks, which would communicate with the computer processor unit 13, to account for water flowing down the drain pipe.

The primary flow sensor 3 may comprise a mechanical flow register or other fluid sensing device. Alternatively, the primary flow sensor 3 may comprise a mechanical turning device disposable nearby or within a pipe and rotatable therewithin using or under the force of the moving fluid.

In order for the flow sensors (primary 3 and secondary 5) to communicate, either or both of the sensors 3, 5 may be provided with wireless communication capability to enable them to send and/or receive electrical signals using a transceiver. Alternatively or additionally, the flow sensors 3, 5 may be provided with electric cables for use in sending and/or receiving instructions/electrical information. In addition, the flow sensors 3, 5 may be provided with an appropriate power supply, for example a battery or connection to a mains power supply. Alternatively, the flow sensors 3, 5 may be operable using a suitable mechanical power generation device, such as one disposable within the fluid flow path, for example one or more rotors driven by fluid flow and connected to a generator. Using more sensitive sensors may be important in gauging flow rates, drips or the presence of a burst or leak more accurately.

Alternatively or additionally, the primary sensor 3 may be provided with an emergency/power failure power supply means, for example a small battery cell, which in use is adapted to effect closure of the control/inlet valve 2, preferably automatically in the event of a power failure.

In certain circumstances, for example when fluid flow detected by one secondary sensor 5 is halted by closure of an outlet simultaneously (or within a few seconds thereof) with the beginning of desirable fluid flow effected by opening another different outlet within a different branch of the system (for example the loft or the garden), there may be a time period in which negative pressure exists within the pipes, which may be mistaken by the relevant secondary sensor 5 as an absence of flow, yet the primary sensor 3 will detect flow (partly due to the pressure from the mains). Thus, the primary sensor 3 may be adapted or configured to delay effecting closure of the mains control valve 2 for a brief time period, during which it awaits on the stimulus signal from any of the secondary sensors 5, regarding the briefly unaccounted flow. If no signal corresponding to the negative pressure is received from any of the secondary sensors 5 after a predetermined time period, the primary sensor 3 will close the mains control valve 2.

Further, a problem may arise when more than one appliance simultaneously draws water, at the same time that a burst or leak occurs within the system. One solution may be to have separate sensors (not shown) monitoring these appliances. Alternatively, a measurement of the known flow rate (by comparison with historical flow rates that will be regularly stored in the computer processor unit's memory, the data containing information of the volumes of water such appliances usually draw off) may help detect the burst or leak. If the known flow rates being registered at a particular moment do not tally or follow a similar pattern (in terms of flow rate) with historical flow rates, the computer processor unit 13 sends a signal to the mains control valve 2, to close down the water supply. A further way of tackling this problem (assuming there is no motion or sound being detected) may be to enable a power consumption sensor(s) to each machine or appliance to communicate with the computer processor unit 13, and to keep the mains control valve 2 open only when the appliances are drawing mains power and in operation. This means that when the power demand to the appliances ceases and the appliances are in standby mode, the power consumption sensor(s) notify(ies) the computer processor unit 13 to close off the mains control valve 2. This would terminate water escape through the burst or leak during authorized flow to an appliance.

The computer processor unit 13 is adapted or configured to coordinate electrical/electronic signals between the flow sensors 3, 5 and the mains control valve 2. In order to do this, the computer processor unit 13 is provided with a controller unit including a microprocessor unit and a memory or data storage unit. Further, the computer processor unit 13 may be provided with wireless capability, so as to send signals using Wi-Fi, infra-red, Bluetooth, radio waves and/or other electromagnetic waves.

The mains control valve 2 can be a solenoid or electrical shut-off valve adapted to interrupt fluid flow within the pipe. Alternatively, the mains control valve 2 can be a mechanical valve, for example a spring based valve or a diaphragm valve.

Further, the mains control valve 2 may comprise a three-way valve (not shown). In such an instance, it may be desirable to have a primary sensor 3 on each branch of the valve, each primary sensor 3 monitoring fluid flow downstream of each branch of the control valve 2. Alternatively, a property owner may be interested in monitoring only one branch of the piping system, in which case a sole primary sensor 3 can be installed onto the relevant branch of the piping.

In a preferred embodiment, the sensors 3, 5, may comprise modular devices that can be mountable to existing pipes at specific points (for example near a house's mains supply inlet valve) without disconnecting existing pipes, disrupting water flow, or disturbing other components. However, it is highly desirable that the stopcock or mains water supply inlet control valve 2 be operable by the present invention. This may be achieved in a number of ways including manual methods, for example by connecting retrofit periphery equipment to the mains supply valve 2, to shut-off or open the valve. Thus, a motor driven arm, which grasps the external valve control lever (or handle), would be operable using the computer processor unit 13 upon detection of a burst or leak signal, so as to shut off the mains supply control valve 2. Similarly, a reset signal would inform the computer processor unit 13 to re-open the valve and flood the pipes.

To effect this, an additional pressure valve may be provided to maintain correct pressure levels within the pipe during reset. However, it will be apparent to the person skilled in the art that other methods may be used to achieve similar effects. Thus, the apparatus may be provided with a pressure buffer, hydraulic pump, expansion vessel or pneumatic pump operatively connectable to the control valve means and a pressure sensor, so as to "re-energize" the system by momentarily opening a valve upon detection of a drop in water pressure. A flow sensor that detects unauthorized flow may then quickly shut off the valve, overriding the pressure sensor. In such an embodiment, the flow sensor is adapted to communicate electrically with the pressure sensor.

In addition, the apparatus may be provided with one or more bypass valves. This may be important because it would ensure that no property is left without water, should a technical fault cause the system to malfunction. Thus, the apparatus would comply with requirements and codes of local councils or water regulatory authorities. Further, if the system is installed so as to be closed in its resting state, then the bypass can be installed using piping with lesser internal pipe circumference than the rest of the property's piping, so that any tests carried out to check for bursts (for example by periodically opening the mains control valve 2 every 30 minutes, waiting a set intervals of, say, 10-15 seconds, while monitoring the primary and secondary sensors 3, 5, and subsequently closing the bypass) do not lead to too much water damage, in the event that a burst or leak has occurred in any one interval between tests. If there were a burst or leak, then water flowing for this short 10 to 15 second period through the narrow bypass would cause very limited water damage. The narrower piping would restrict the volume of water diverted through the bypass during these periodic tests, while the main and wider channels remained closed.

For ease of use, the apparatus may be provided with a reset interface, for example a fob that is manually operable to reset the system if a sensor has failed or when there is a faulty sensor or other technical failure. This means that if a secondary sensor 5 fails, for example that secondary sensor 5 in the bathroom 15 (FIG. 1), then if a tap adjacent that sensor is opened, the primary sensor 3 will pick up this corresponding water flow, but there will be no corresponding signal indicative of that particular stimulus from the secondary sensor 5 if the secondary sensor 5 has malfunctioned, with the result that the primary sensor 3 will disrupt flow and shut off the mains control valve 2. To stop this anomaly, a user can depress a button (or the fob/remote control) to send a signal to the primary sensor 3 to open the control valve 2, and for a brief time period (for example for a 60 minutes period or so) allow water to enter that section. This means that the system will have been reset.

However, once the tap is re-opened after that period of time, the primary flow sensor 3 will not pick any flow signal from the relevant secondary sensor 5. Thus, it will shut off the mains control valve 2 again. This means that the piping will be protected, even in the presence of a sensor failure, yet the inhabitants of the property will not be left without water, even though the constant need for resetting the system will present a nuisance factor that is likely to prompt the inhabitants of the property to get the sensors checked and fixed.

In the event that a burst or leak has occurred and the apparatus has shut off the mains control valve 2, it may be desirable to provide a means of pinpointing precisely where the burst or leak has occurred. This may be done in a number of ways, including checking for visual signs of damage to the piping, or for leaks from the residual water in the piping. Another way may be by using odoured or coloured gas. This is made possible because the apparatus may be provided with gas inlet means, operable to allow compressed or non-compressed air or other gas to be introduced into the piping so as to determine the position of a burst or leak. Before this gas can be injected into the pipework, it may be necessary to drain off residual water in the pipework first, as there can often be several gallons/litres left in the pipes. Thus, depending on design constraints (and factors such as the lowest point vertically within the piping), the gas inlet means could also be used as a drain-off point to let the water out before injecting the gas in.

Implementation of this apparatus is beneficial for many reasons, including a reduction in risk of damage to buildings and/or contents as a result of bursts or leaks. Additionally, the apparatus provides an intelligent and sensitive system that can distinguish between a desired fluid flow from an undesired or accidental fluid flow.

Figure 2:
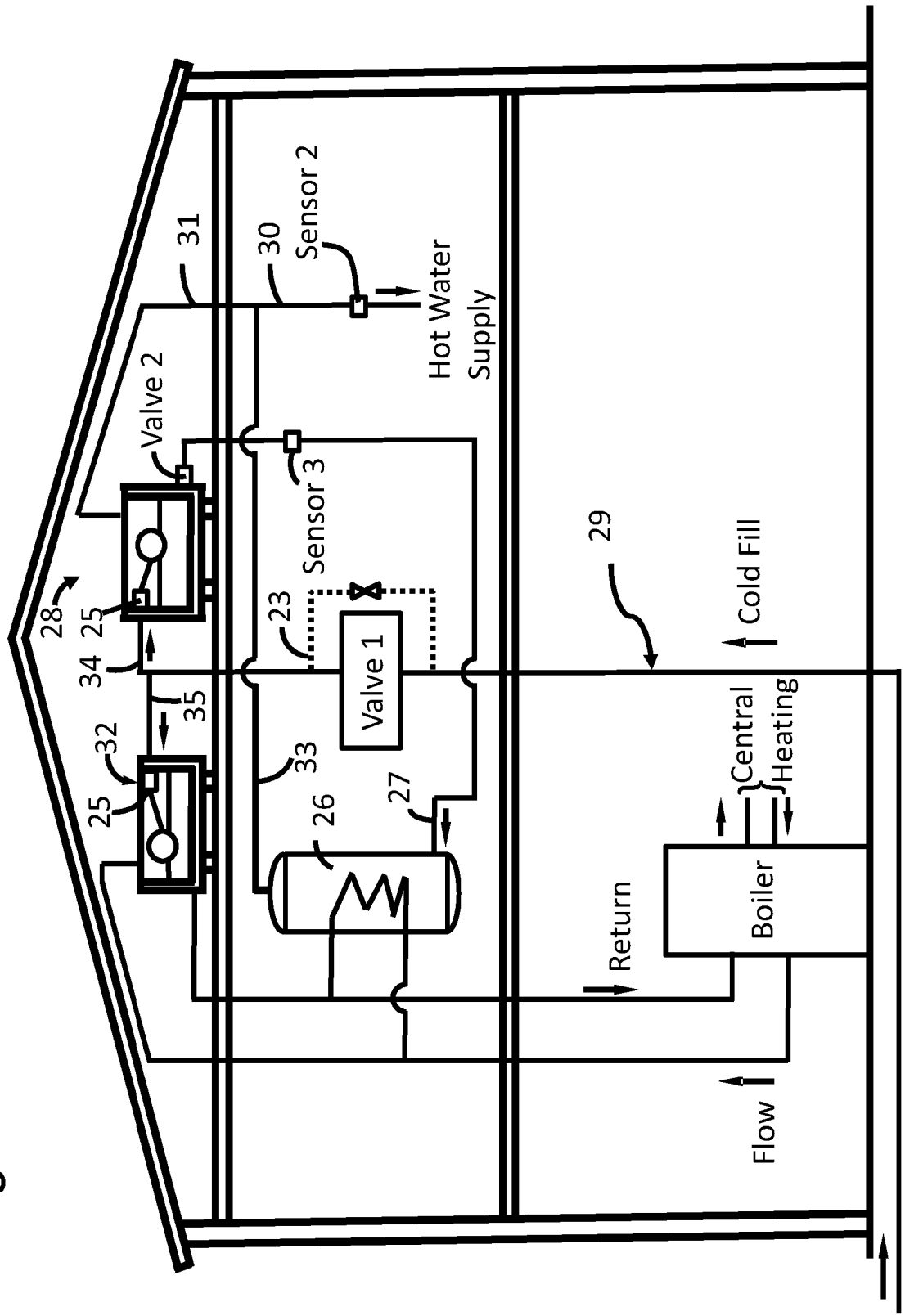
FIG. 2 is a schematic diagram showing the apparatus connected in a vented hot water system.

Another significance is that the apparatus can prevent overflow in tanks 28 (as shown in FIG. 2), such that even if the ballcock 25 (FIG. 2) gets damaged, and even if an overflow pipe (not shown) is provided for the tank 28, then there will be no water wastage and therefore no danger of water overflowing as the sensors will ensure that the valves close (or remain closed) upon detection of an unauthorized flow.

In addition, during maintenance or when adding additional equipment or alterations to the existing pipework, if a plumber inadvertently cuts a water pipe without turning off the mains supply valve, which is quite a common occurrence in the plumbing industry, this apparatus is advantageous as it will prevent pressurized water from the mains supply flooding the property.

Further, in a situation where a burst pipe has occurred at a distal end of the property's piping, for example in the loft 4 section (FIG. 1) which may only be accessible by a flight of stairs or ladder or the like and where the mains control valve 2 is located much further away at a proximal end of the property's piping relative to the mains control valve 2, a plumber would need to cut off the property's water supply by closing the mains control valve 2, after which he/she would get to work to try and fix the burst/leak. After this is fixed, it then becomes necessary to get back to the stopcock or control valve 2 and turn the water back on. Yet if it were to be located in a section of the property away from the section of piping where the burst/leak had occurred, this back and forth movement between the control valve 2 and the loft becomes time consuming, stressful, and can lead to additional damage if the repaired section is still experiencing leaks, since once the control valve 2 is opened, water would have squirted through any cracks during the time it takes the plumber to move from the control valve 2 to the burst/leak area. Further, there is no way of knowing whether the piping has more than one burst or leaking pipe, except by looking to see where the damage is, or where the water is leaking from, or by interpreting the damage done. Embodiments of the present invention may solve or ameliorate this problem, because not only will it be possible to reset the system from the loft (for example using the reset fob, or using any of the secondary sensors 5), but if there is more than one burst/leak, as soon as the control valve 2 is re-opened by a reset, the primary sensor 3 will immediately detect any other unaccounted or unauthorised fluid flow and close off the control valve 2 again, thereby cutting off the water supply and preventing any further leakage.

For large commercial installations, for example within a hotel's piping, if a single burst pipe is fixed and the main control valve 2 re-opened or switched back on, there is usually no accurate indicator to show whether there may have been another water escape within the piping, or whether there is a tap within the hotel that has been inadvertently left on (or tanks that are calling for water or refilling).

However, with embodiments of the present invention, it may be possible to accurately distinguish between a legitimate flow and an unauthorised flow or water escape in this scenario.

In a preferred embodiment as shown in FIG. 2, the fluid leakage control apparatus is operatively connectable over a vented hot water system. In this implementation a first valve 1 (which in its standby or resting state is closed so as not to allow water therethrough) is preferably disposed along or within a pipe so as to isolate the cold water storage tank 28 from the cold fill mains fluid supply 29. It is important that valve 1 should be upstream of the junction of pipe section 34 and pipe section 35, on the side of the cold water fill as shown in FIG. 2, otherwise it will be unable to work optimally. In this case, downstream of the junction is in the direction of the arrows along pipe sections 35 and 34.

In addition, a first flow sensor 2 (which can function as the primary sensor, although preferably the embodiment of FIG. 2 may be a branch of the system of FIG. 1) is connected along a pipe downstream of (i) a hot water cylinder 26 and (ii) an expansion pipe 31 of a cold water tank 28.

Conversely, downstream of the hot water supply in FIG. 2, between pipe 30 and the hot water taps, other sensors that function in the same way as sensor 2 may be fitted as near as possible to the taps, so that the piping between those sensors and sensor 2 is protected. However, if there is only one hot water tap, then sensor 2 may be located as near as possible to this tap. This way the whole length of pipe 30 will be protected.

The first flow sensor (sensor 2) is adapted or configured to detect fluid flow across it, for example when a hot water tap (not shown) is urged open. A second flow sensor (sensor 3) is provided downstream of the cold water storage tank 28 preferably adjacent a second valve (valve 2) that is connected near the outlet of the cold water storage tank 28. Valve 2 is adapted or configured to isolate the cold water storage tank 28 from the hot water cylinder 26, although its normal resting state is in an open position. In use the apparatus works in that when sensor 2 detects a flow within the pipe, it sends a signal to valve 1 to open the valve, and another signal to sensor 3 to keep valve 2 open. Once valve 1 is opened, water is free to flow under the pressure from the mains supply cold fill to the cold water storage tank 28, upon opening of the ballcock-controlled inlet 25. This means as long as the hot water tap remains opened, water will flow from the hot water cylinder 26 to a hot water tap (not shown). This is possible because pressurized water from the mains will flow along the cold fill pipe 29 through pipe 34 into the cold water storage tank 28, across the valve 2 and sensor 3 along pipe 27 into the hot water cylinder 26. Here it is heated by water within an isolated coil of the central heating system, and as it heats up it rises to the top of the hot water cylinder 26 and flows out to the pipe 33 into pipe 30 across sensor 2 to the hot water tap. However if a burst or leak develops in one of the pipes, for example along pipe 34, since valve 1 is normally closed, a flood will be prevented since the only water to leak through the burst/leak will be that which is actually in the pipe, and not the water from the mains. Further, if a burst or leak develops within pipe 27, then sensor 3 will detect it and inquire of sensor 2 to ascertain if sensor 2 has picked up a desired/authorized flow. If sensor 2 is silent or does not broadcast a flow state, then sensor 3 will immediately shut off valve 2. In this manner the flow sensors are adapted or configured to communicate with each other in order to detect and announce an unauthorized fluid flow state and thereby to prevent flooding, since the water that will leak through is only that which is actually in the pipe along which the burst/leak has occurred, and not water in the loft tank/cistern (which can have a capacity of upwards of gallons, and which if it leaked could cause considerable damage).

Note that it may be important that the first valve 1, when in its standby state, is in a shut-off or closed position, since only then will water from the cold fill (along pipe 29) be isolated from the water in the cold water storage tank 28.

In a similar manner valve 2 in its standby state is adapted to be in an open position. This may be important because only then would sensor 3 be able to detect flow, and upon the absence of a signal from sensor 2 shut off mains valve 2.

The apparatus may be provided with a bypass valve (shown along path 23). Alternatively, each of the valves may be provided with an inbuilt bypass valve.

Further, in order for the implementation in FIG. 2 to work optimally, flow sensor 2 is adapted to open or close valve 1. Alternatively or additionally, the flow sensor 2 may be adapted to close or open the valve 2. Similarly, sensor 3 may be adapted to open or close the valve 1.

Some embodiments of the present invention may be provided with a switching mechanism, for example one or more relay switches (not shown), to open or close valve(s) upon receiving a signal from a relevant sensor, or a computer processor unit to coordinate the signals thereof. In addition, each of the sensors may be provided with wired or wireless signal transmission means in order to be able to communicate using electrical or electromagnetic signals with any of the valves;

Further, each sensor may be provided with an indicator means, for example an LED, to indicate when there is fluid flow across the sensor. This may be important because it may provide a visual aid to alert the presence of fluid flow within each sensor, even when the system is e.g. in manual override (when the electronics may not be able to interrupt water flow by closing the mains control valve). For example, by incorporating one or more counters that add the total number of litres of fluid passing through one point, and if there is a leak within the system while the taps are off, then the counter(s) will continue rising, indicating a burst/leak state.

Figure 3:
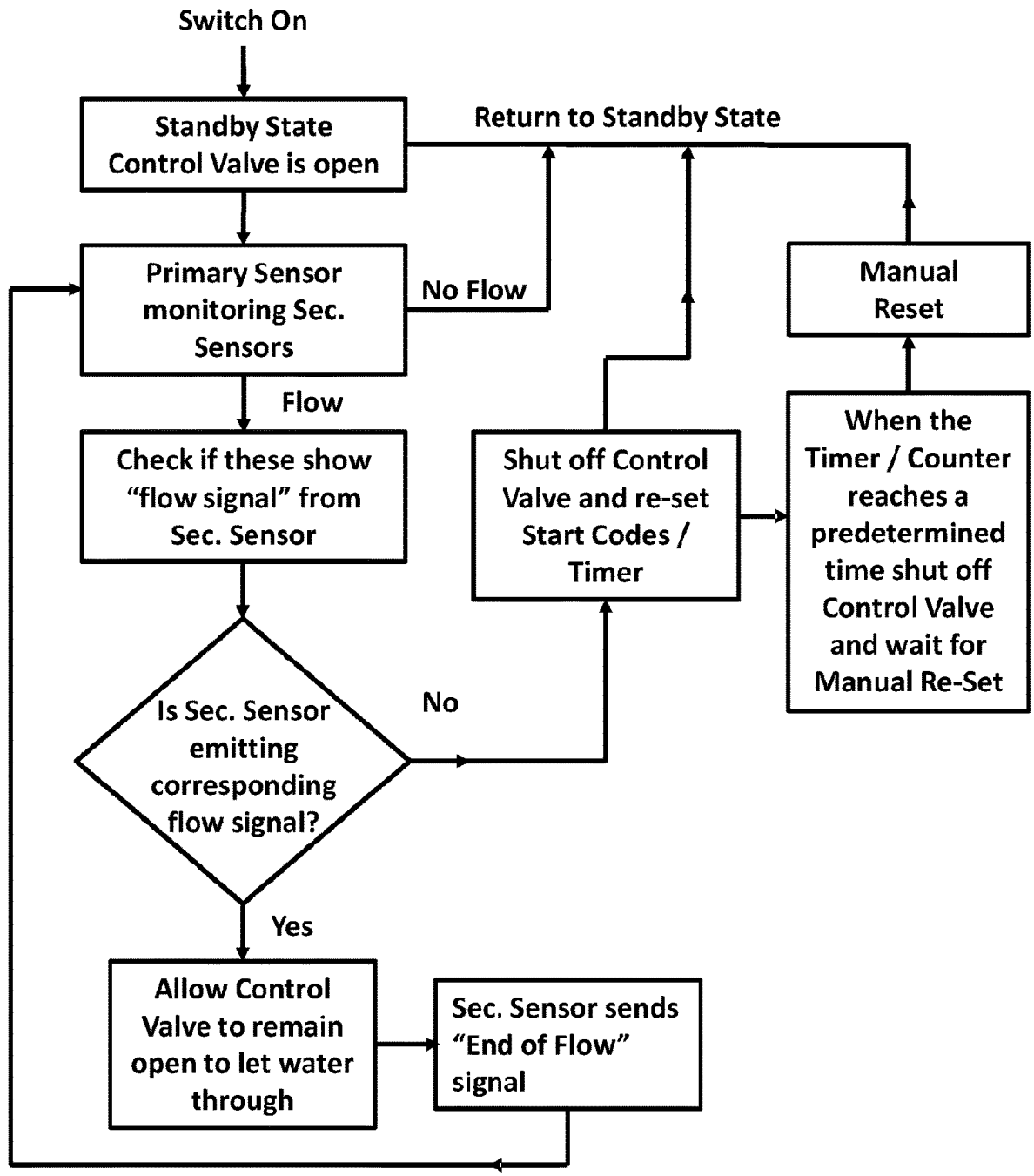
FIG. 3 is a flow diagram showing typically the steps undertaken by the apparatus and/or software routine to differentiate an authorized flow from an unauthorized flow.

Some embodiments of the apparatus in use provide means of detecting a leak—as shown for example in FIG. 3. To do this, each sensor is adapted to perform a surveillance method of the state of the fluid within it or passing through it. Thus, once the apparatus has been connected to a water system as described above, each sensor in its standby state will continuously monitor the fluid passing across it, whether it is moving or stationary, and emit a signal that is read by the primary sensor and logged by the computer processor means. If there is fluid flow within the fluid flow path, the sensor will await a signal from another sensor, that signal being indicative of a recognized or authorized fluid flow. At the same time, the sensor will start a counter or timer (and if a PCB unit is provided, this may be done using the software in the computer processor). If no signal indicative of an authorized fluid flow is received after a predetermined period, the sensor will send a signal to a valve (which may be a control valve) to interrupt or shut off the valve, shutting off fluid supply and thereby preventing leakage of fluid.

In an instance where one of the sensors develops a fault or malfunctions, the apparatus may be provided with an override switch to override that particular sensor so that the primary sensor would not be expecting a signal from it. In this case, the primary sensor may be adapted or configured not to shut off the mains valve 2 if an outlet corresponding to a faulty secondary sensor 5 is opened, meaning water will still be able to flow out of that outlet so long as the sensor is disabled.

Thus, if a secondary sensor 5 adjacent a toilet tank develops a fault, for example, a resident of the house can activate the override switch to disable it. Once repaired, the switch can then be re-operated again to re-enable the sensor. Note that if a sensor develops a fault, it may be important that the apparatus be provided with a mechanism or an indicator having nuisance value to remind the inhabitant(s) that the system requires repair. Alternatively or additionally, the PCB unit may be adapted to send a signal to the control centre to inform technicians of the need for repair. Similarly, the primary sensor may also be provided with an override, to disable it from shutting off the mains control valve 2. Furthermore, the time period in which authorized flow is allowed, after the motion sensor(s) or sound sensor(s) first detect motion or sound might need to be variable. This may be important if it is the case that parts of a dwelling or property have a machine that requires a lot of water (for example a Jacuzzi). It would be inconvenient to keep going to check such a machine while it fills up, so as to activate the sensors, if it takes a long time to fill up.

Additionally, it may be necessary to provide insulation for all components in a system incorporating embodiments of the present invention, to prevent them freezing, should the control valves themselves freeze. Thus, the valve(s) could include in-built thermostatically controlled trace heater(s) to prevent freezing.

In use, embodiments of the fluid leakage apparatus works to detect fluid leakage and loss of fluid, and safely cut-off the mains water supply to prevent damage to homes or property. The system can be installed in zones, where various fluid control apparatuses are connected in different branches of a property, such as a hotel or student accommodation flats, but are nevertheless managed from the same computer platform.

The system may include an alarm unit for alerting anyone nearby of the existence of a leakage or potential leakage, and an automatic electrically operated valve for shutting off the fluid flow to prevent damage. The apparatus may be designed for use as either a stand-alone unit or as part of a communications system, for example as part of a domestic alarm or gas supply or heating system. Sound sensor(s) may also be provided to enable activation of the system or switching from a protected state, where the sensors are communicating to prevent a burst or leak, to a manual override mode, e.g. by using certain voice commands, in order to switch the flow on or off.

Further, the computer processing unit 13 may be adapted to interface to an Artificial Intelligence system, or machine learning program, so as to be able to study water usage patterns and other similar data, and so as to automatically adjust the sensor or valve settings for maximum protection or optimum operation of the system. The override may be adapted to also terminate this functionality.

In the stand-alone arrangement or configuration, the system may serve to protect residential apartments, houses or industrial plumbing installations against leakage, burst pipes or flooding of water (hot or cold) or gas. In this arrangement or configuration it may for example also be connected to a central communications system deployed over an internet network, thereby giving a user access to the system from any location, or from a mobile telephone or mobile computing means. This may also be important since if an alarm signal notifying inhabitants of a house is ignored or not responded to, once the system shuts off, the computer processor unit may be adapted or configured to automatically send an email and/or text (or other type of electronic message) and/or inform the property owner or a central control centre of the actual or potential burst/leak so that they can turn the water off, or alert engineers to go and inspect the installation, and/or reactivate the valves, repair the fault(s) and/or notify the property owner.

In some embodiments of the system, it may be possible to use a key switch or a combination of activated switches (wired or wireless) in areas where only authorized persons are using water outlet points, for instance outside taps, water taps in outhouses or garages and suchlike, e.g. where water could be drawn off by an unauthorized person who might nevertheless subsequently leave the tap running. This is undesirable as it wastes water, and can increase water costs when a water meter is fitted or it is a hot water tap. Activation of these types of switches would open the inlet valve and allow water to flow. Any person without the key or code would be unable to access these outlets.

There is also an issue with remote control to any part of the water or gas system in the property by for instance mobile phone. Any of the main functions of the apparatus could be controlled, monitored or overridden by mobile phone activation, i.e. all the operations of any of the sensors, and the system's shutting off could be controlled by mobile phone technology. In addition, each time a burst/leak state or another error has been discovered, the processor unit could be designed to have an interface to a fixed line telephone, Wi-Fi or mobile telephone network, in order to ring a number, send an alert signal, or send a text or other message to one or more designated numbers, for example a support hotline, or the proprietor of the house, in order to report the fault.

A mobile phone application could be provided to control the apparatus, and to close off or open the mains control valve. This would enable a property's proprietor to be notified of any potential bursts/leaks. It would also enable them to remotely shut off the water supply—for example, when going on holiday but when the proprietor inadvertently forgets to manually switch on the system, or for a zoned system (for example a hotel) to keep some zones open and others shut. It may also be adapted to log faults and provide historical data on pressure, flow rates, flow volumes and generally enable water usage data to be remotely monitored.

Further, regarding unattended unmanned outlets such as the boiler system, the water pressure in a boiler system could for instance be monitored remotely and refilled or topped up using suitably placed control valves of an embodiment of the present apparatus. This would complement the known system of being able to turn the boiler on or off remotely, since if the boiler system is below pressure, the boiler will not fire up, resulting in the owner returning to an unheated property.

In some embodiments a battery back-up power supply source may be desirable or required, especially in order to power the apparatus in the event of a power failure. This may be an important precautionary measure in adverse cold weather, when an electric power supply may be interrupted by thunderstorms or heavy winds (which can bring down pylons), such that a burst or leak could develop at around the same time when an area is experiencing electric power supply outages.

Some water authorities may require embodiment systems of the invention to be pressurized.

Thus, the apparatus may be provided with a pressure monitor that communicates with the computer processing unit, and upon pressure drop can alert the computer processing unit to open the mains control valve and slowly re-pressurize the system, in order to maintain the pressure above a certain threshold. The by-pass water channel can be used for this. This may also be useful when undertaking burst detection tests, in that the system is able to distinguish between minor pressure drops, common to water systems, and a burst/leak. In order to do this, the system would need to be sensitive to pressure variations and the rate of water flow (for example dripping taps). One way of achieving this might be to use the magnetic field of the solenoid valve that is commonly used in control valves, to detect flow. Alternatively, the computer processing unit may use data from the flow sensors to gauge the gradual increase in pressure in the system, when the main control valve has been opened during tests. If there is a dripping tap, then as the system is re-pressurized the rate of flow of water registered by the flow sensors will decrease (from an initial higher rate of flow at the beginning of the test). Software in the computer processing unit will recognize this. This can also be used to manually set tolerances as to what volume of drips from the taps should be ignored as inconsequential, minor or not posing a risk. This means that the primary sensor and computer processing unit can distinguish between a constant, unchanging flow (indicative of a burst/leak), and a gradually reducing flow (as the pipework refills), when it had been drained by a dripping tap.

In addition, the computer processor unit could use historical data to map normal pressure drops into a weekly, monthly or annual pressure profile or "signature" of the system. The pressure profile will be largely consistent for a system that does not have leaks, and will not have extraordinary or divergent variations. However, a sudden pressure drop created by a burst pipe will create a sudden drop in pressure, and the resulting change in pressure will differ significantly from the gradual decrease of pressure of the low-pressure profile created over periods when there is no burst pipe or leaks in the system.

The problem of the apparatus or its constituents producing noise, for example the opening and closing off of valves during system checks producing clicks, thuds and clanks, which could be noisy at night, can be tackled by using low-noise components, or using acoustic barriers and noise absorbing dampers, where possible, to go over, isolate or engulf such components. Alternatively or additionally, a switch may be provided on a control user panel, to control the switching on and off of the system, with options for automatically or manually switching the system off during certain periods.

If a burst or leak occurs along the lower levels of the piping in a building in which the apparatus is installed, there may be a problem of flooding as a result of backflow, as the water in the upper levels of the piping may flow backwards towards the lower levels, and through the burst hole or crack, thereby damaging the surrounding areas.

One way of overcoming such a problem may be to use a non-return valve. The non-return valve must have a flow sensor downstream of it (considering the direction of normal water flow), and be connected to the computer processor unit for it to detect backflow (when water is moving in the opposite direction to the normal flow direction). A solenoid valve may be used as such a non-return valve, and may be closed off once the flow sensor located downstream of it registers backflow.

Embodiments of the fluid leakage control apparatus could be linked to the fire alarm and smoke detection systems of a property, in order to help prevent false or erroneous sprinkler activation, which are known to cause water damage. In such an installation, the fluid leakage control apparatus could be used to allow authorized flow only after both smoke detector and the fire alarm have been triggered. This means the application programming interface of the computer processor unit should in this instance be designed to communicate with signals and communication architectures used in fire alarm and smoke detectors.

Any of the above embodiment implementations may offer the benefit of preventing water wastage from e.g. dripping taps, or taps accidentally left running, or overflow pipes left running.

Having described and illustrated the principles of the invention with reference to preferred embodiments, it will be apparent to a skilled person in the art that embodiments of the invention may be modified in arrangement and detail without departing from the basic principles as set out in this specification. Accordingly, in view of the many possible embodiments to which the principles may be put, it should be noted that the detailed embodiments described above and illustrated in the accompanying drawings are illustrative only and should not be taken as limiting the scope of the invention, which is defined by the appended claims.

Throughout the description and claims of this specification, the words "comprise" and "contain" and linguistic variations of those words, for example "comprising" and "comprises", mean "including but not limited to", and are not intended to (and do not) exclude other moieties, additives, components, elements, integers or steps.

Throughout the description and claims of this specification, the singular encompasses the plural unless expressly stated otherwise or the context otherwise requires. In particular, where the indefinite article is used, the specification is to be understood as contemplating plurality as well as singularity, unless expressly stated otherwise or the context requires otherwise.

Features, components, elements, integers, characteristics, properties, compounds, chemical moieties or groups described in conjunction with a particular aspect, embodiment or example of the invention are to be understood to be applicable to any other aspect, embodiment or example described herein unless incompatible therewith or expressly stated otherwise.

The invention claimed is:

1. A fluid leakage control apparatus comprising:
   at least one primary sensor means disposed generally along or within a fluid flow path downstream of a mains fluid supply inlet means, the or each primary sensor means being configured and operable to send and/or receive signals upon detection thereby of flow of fluid within the fluid flow path;
   at least one secondary sensor means disposed along or within the fluid flow path downstream of the primary sensor means and optionally adjacent a fluid outlet means, the or each secondary sensor means being configured and operable to send and/or receive signals in response to detection thereby of a condition indicative of an authorized or legitimate or recognized flow of fluid within the fluid flow path to a or a respective fluid outlet means;
   at least one control valve means adapted or configured to interrupt fluid flow within the fluid flow path when instructed to do so;
   at least one processor means operably connected communicably with either or both of the primary sensor means and the secondary sensor means, and being configured and operable to coordinate and/or send and/or receive signals between the primary sensor means and secondary sensor means, or between either or both of the primary sensor means or secondary sensor means and the control valve means;
   the at least one control valve means being operably connected to receive instructions from the processor means and/or either or both of the primary and secondary sensor means;
   wherein in use the primary sensor means and the secondary sensor means are adapted or configured to exchange information therebetween, via the processor means, so as to detect an unauthorized or illegitimate or unrecognized fluid flow state within the fluid flow path, and upon such detection of such an unauthorized or illegitimate or unrecognized fluid flow state, to instruct the control valve means to interrupt the fluid flow within the fluid flow path;
   and wherein the apparatus is provided with a timer means for recording the length of time of continuous or uninterrupted fluid flow in the fluid flow path.

2. A fluid leakage control apparatus according to claim 1, wherein at least one of, optionally each of, the primary sensor means and the secondary sensor means comprises a respective flow sensor adapted or configured to detect flow of fluid within or along the fluid flow path;
   optionally wherein, where the secondary sensor means comprises a respective said flow sensor, the secondary sensor means is adapted or configured to communicate with the primary sensor means and/or the control valve means;
   and further optionally wherein each of the primary and secondary flow sensor means is provided with indicator means for indicating when fluid flow within the fluid flow path is detected in or across each respective said flow sensor means.

3. A fluid leakage control apparatus according to claim 1, wherein:
   (i) the primary sensor means comprises a mechanical flow register or other fluid flow sensing device; or
   (ii) the primary sensor means comprises a mechanical revolving means disposed within the fluid flow path and rotatable therewithin using or under the motion or force of moving fluid.

4. A fluid leakage control apparatus according to claim 1, wherein the primary sensor means is either:
   (i) provided with wireless communication means which are operable or configurable to enable it to send and/or receive electromagnetic signals using a transceiver means; or
   (ii) provided with electric cabling means for use in sending and/or receiving electrical information.

5. A fluid leakage control apparatus according to claim 1, wherein the primary sensor means is either: (i) provided with power supply means; or (ii) is powered using a mechanical power generation means, optionally one or more rotors driven by fluid flow within the fluid flow path and connected to a generator;
   optionally wherein the primary sensor means is provided with a power failure/shut-down power supply means, which in use is adapted or configured to effect closure of the control valve means in the event of a mains power failure.

6. A fluid leakage control apparatus according to claim 1, wherein:
   (i) the outlet means comprises a water outlet means, optionally a water outlet means comprising a water tap, toilet tank water supply inlet, washing machine water supply inlet, shower or boiler water supply inlet; or (ii) the outlet means comprises an oil or gas outlet means; or
(iii) the outlet means comprises an industrial supply outlet, optionally a supply outlet on a beverage mixing machine.

7. A fluid leakage control apparatus according to claim 1, wherein the or each secondary sensor means is selected from one or more of the following:
(i) a secondary flow sensor for sending and/or receiving signals in response to detection thereby of the presence or absence of fluid flow within the fluid flow path to the or the respective fluid outlet means;
(ii) a motion sensor for sending and/or receiving signals in response to detection thereby of movement of a person in one or more areas where fluid can be drawn off via the or the respective fluid outlet means;
(iii) a sound sensor for sending and/or receiving signals in response to detection thereby of the presence of a person in one or more areas where fluid can be drawn off via the or the respective fluid outlet means;
(iv) a fluid presence sensor for sending and/or receiving signals in response to detection thereby of the presence of fluid such as water or gas in the vicinity thereof;
and optionally wherein the or the respective secondary sensor means is located adjacent the or the respective fluid outlet means.

8. A fluid leakage control apparatus according to claim 1, wherein the or each secondary sensor means is provided with either: (i) wireless communication means, which are operable or configurable to send and/or receive electromagnetic signals using a transceiver means or (ii) electric cabling means for use in sending and/or receiving electrical information or signals.

9. A fluid leakage control apparatus according to claim 1, wherein the or each secondary sensor means is either: (i) provided with power supply means; or (ii) is powered using a mechanical power generation means, optionally one or more rotors driven by fluid flow within the fluid flow path and connected to a generator;
optionally wherein the or each secondary sensor means is provided with a power failure/shut-down power supply means, which in use is adapted or configured to effect closure of the control valve means and/or mains fluid supply inlet means in the event of a power supply failure.

10. A fluid leakage control apparatus according to claim 1, wherein the processor means comprises a computer processor means, or a computer processor means comprising one or more switching controllers;
and wherein one or more of the following (i), (ii), (iii), (iv), (v), (vi) or (vii) is present or satisfied:
(i) wherein the computer processor means is adapted or configured to coordinate and/or send electrical and/or electronic signals between the primary sensor means and the or each secondary sensor means;
(ii) wherein the computer processor means is adapted or configured to coordinate and/or send electrical and/or electronic signals between the or each secondary sensor means and the control valve means;
(iii) wherein the computer processor means is adapted or configured to coordinate and/or send electrical and/or electronic signals between the primary sensor means and the control valve means;
(iv) wherein the computer processor means is adapted or configured to send wired and/or wireless signals to a central command or control centre using electromagnetic waves;
(v) wherein the computer processor means is adapted or configured to be built into one or more of the sensor means;
(vi) wherein the or each secondary sensor means is adapted or configured to send signals indicative of fluid flow within the fluid flow path to the computer processor means;
(vii) wherein the primary sensor means is adapted or configured to enable the control valve means to close or open the fluid mains supply in response to signals sent from the computer processor means.

11. A fluid leakage control apparatus according to claim 1, wherein either:
(i) the or each secondary sensor means is adapted or configured to send signals indicative of fluid flow within the fluid flow path to the primary sensor means using transceiver means; or
(ii) the or each secondary sensor means is adapted or configured to send signals to the primary sensor means, such signals being indicative of the absence of fluid flow within the fluid flow path, using transceiver means.

12. A fluid leakage control apparatus according to claim 1, wherein the apparatus is provided with one or more manual or electronic bypass valves, the bypass valve(s) optionally being enabled or disabled by a switch means or remote control means;
and further optionally wherein the processor means comprises a computer processor means, the computer processor means optionally comprising one or more switching controllers, and the computer processor means is adapted or configured to communicate with any one or more of the bypass valve(s).

13. A fluid leakage control apparatus according to claim 1, wherein the apparatus is provided with inbuilt bypass capability within the control valve means, optionally by virtue of one or more zone valves.

14. A fluid leakage control apparatus according to claim 1, wherein the apparatus is provided with alarm means for providing an audio and/or visual signal of the presence of a said unauthorized or illegitimate or unrecognized fluid flow state indicative of a leak or potential leak;
optionally wherein the apparatus is adapted or configured to send a text message to a telephone number, or an email or other form of electronic message to a designated recipient, informing the recipient or the owner of the number of the said unauthorized or illegitimate or unrecognized fluid flow state indicative of the leak or potential leak;
and further optionally wherein the apparatus is provided with switch means for disabling the alarm or for effecting a temporary snooze function that temporarily silences the alarm for a pre-set period.

15. A fluid leakage control apparatus according to claim 1, wherein the apparatus is provided with either or both of:
(i) a visual signal means and/or user interface panel which is adapted or configured to display messages for providing a visual signal or indication of the state of the apparatus, optionally logging errors and/or warning of the presence of a said unauthorized or illegitimate or unrecognized fluid flow state indicative of a leak or potential leak; and/or
(ii) a standalone interface or display unit for effecting any of, or any combination of:
providing information on the state of the apparatus, providing an indication of any suspicious fluid flow, storing a log of events, and coordinating different components of the system; and thereby functioning as a central communications and/or control unit.

16. A fluid leakage control apparatus according to claim 1, wherein the apparatus is provided with remote control means for resetting the control valve means that may effect disruption or cut-off of, or may have disrupted or cut off, fluid flow.

17. A fluid leakage control apparatus according to claim 1, wherein the apparatus is provided with a pressure buffer or expansion vessel operatively connected to the control valve means and a pressure sensor means, and wherein in use the pressure buffer functions to maintain pressure levels within the fluid flow path by opening for only a short period of time a valve upon detection of a drop in fluid pressure within the fluid flow path, optionally wherein one of the primary and secondary sensor means that subsequently detects this pressure drop as an unauthorized or illegitimate or unrecognized flow then quickly shuts off the valve again, overriding the pressure sensor, with that sensor means communicating electrically or electronically or wirelessly with the pressure sensor.

18. A fluid leakage control apparatus according to claim 1, wherein either:
   (i) one or more of the primary and secondary sensor means is switchable, for enabling or disabling the fluid leakage control apparatus; or
   (ii) each of the primary and secondary sensor means is able to be turned on or off, and the apparatus is able to be disabled, from a switch, thereby cutting off supply from the mains fluid supply inlet means without the need to access the mains control valve means.

19. A fluid leakage control apparatus according to claim 1, wherein the apparatus is provided with switch means, optionally one or more relay switches and optionally one or more computer processing means for coordinating signals thereof.

20. A fluid leakage control apparatus according to claim 1, wherein each of the primary and secondary sensor means is adapted or configured to communicate with at least one of the control valve means, optionally wherein each of the primary and secondary sensor means is provided with wired or wireless signal communication means for electrically or electronically communicating with one or more of the control valve means.

21. A fluid leakage control apparatus according to claim 1, wherein the control valve means comprises one or more manual valves operable using geared or motorised retrofit devices that are operable by the respective sensor means.

22. A fluid leakage control apparatus according to claim 1, wherein the apparatus is provided with gas inlet means operable to allow compressed or non-compressed air or other gas to be introduced into piping or pipework/conduit (s) defining the fluid flow path for the purpose of, in use, determining the position of a hole, crack, burst or fracture, in the event of a burst pipe.

23. A system of fluid leakage control comprising:
   a first valve means disposed along or within a fluid flow path so as to isolate a section of the fluid flow path that feeds into a cold water storage tank from a section of the fluid flow path connected to a mains fluid supply;
   a first flow sensor means disposed along or within the fluid flow path, preferably downstream of (i) a hot water cylinder and (ii) an expansion pipe of the cold water storage tank, the first flow sensor means being adapted or configured to detect fluid flow across it;
   a second flow sensor means disposed downstream of the cold water storage tank, adjacent a second valve means which is disposed adjacent an outlet of the cold water storage tank, the second valve means being adapted or configured to isolate the cold water storage tank from the hot water cylinder;
   at least one processor means operably connected communicably with either or both of the first and second flow sensor means and being configured and operable to coordinate and/or send and/or receive signals between the first and second flow sensor means or between either or both of the first and second flow sensor means and the first valve means;
   the first valve means being operably connected to receive instructions from the processor means and/or either or both of the first and second flow sensor means;
   wherein, in use, the first flow sensor means is adapted or configured to communicate with the second flow sensor means to exchange information therebetween, via the processor means, so as to detect an unauthorized or illegitimate or unrecognized fluid flow state within the fluid flow path indicative of a leak or potential leak therein, and upon such detection of such an unauthorized or illegitimate or unrecognized fluid flow state to instruct the first valve means to interrupt the fluid flow within the fluid flow path;
   and wherein the system is provided with a timer means for recording the length of time of continuous or uninterrupted fluid flow in the fluid flow path.

24. A system of fluid leakage control according to claim 23, wherein the first valve means is adapted or configured, in its standby state, to be in a shut-off or closed position.

25. A system of fluid leakage control according to claim 23, wherein either:
   (i) water from a cold fill is isolated from the water in the cold water storage tank; or
   (ii) the first valve means prevents water from the cold fill from mixing with the water in the cold water storage tank.

26. A system of fluid leakage control according to claim 23, wherein the second valve means is adapted or configured, in its standby state, to be in an open position.

27. A system of fluid leakage control according to claim 23, wherein water from the cold water storage tank is in fluid communication with the water in the hot water cylinder by means of the water in the pipe(s) leading to the cylinder.

28. A system of fluid leakage control according to claim 23, wherein:
   (i) the first valve means is provided with a bypass valve means; or
   (ii) the first valve means comprises an inbuilt bypass valve means.

29. A system of fluid leakage control according to claim 23, wherein one or more of the following (i), (ii), (iii) or (iv) is present or satisfied:
   (i) wherein the first flow sensor means is adapted or configured to open or close the first valve means;
   (ii) wherein the second flow sensor means is adapted or configured to close the second valve means;
   (iii) wherein the first flow sensor means is adapted or configured to close or open the second valve means;
   (iv) wherein the second flow sensor means is adapted to open or close the first valve means.

30. A fluid leakage control method comprising providing a fluid leakage control apparatus as defined in claim 1 followed by the steps of:
   monitoring a fluid flow path to ascertain if there is fluid flow within the fluid flow path;

upon detecting fluid flow, awaiting a signal from a or a respective said secondary sensor means indicative of an authorized or legitimate or recognised fluid flow, and starting a counter or timer;

and if no such signal indicative of the said authorized or legitimate or recognised fluid flow is received after a predetermined period, sending a signal to the control valve means to interrupt or shut off the fluid flow path, thereby closing off fluid supply from the mains fluid supply inlet means, and thereby preventing leakage of fluid from the fluid flow path;

optionally wherein the steps of: monitoring a fluid flow path to ascertain if there is fluid flow within the fluid flow path; upon detecting fluid flow, awaiting a signal from a or a respective said secondary sensor means indicative of an authorized or legitimate or recognised fluid flow, and starting a counter or timer; and if no such signal indicative of the said authorized or legitimate or recognised fluid flow is received after a predetermined period, sending a signal to the control valve means to interrupt or shut off the fluid flow path, thereby closing off fluid supply from the mains fluid supply inlet means, and thereby preventing leakage of fluid from the fluid flow path, are carried out by associated computer software.

* * * * *